(12) United States Patent
Heuft et al.

(10) Patent No.: US 7,207,444 B2
(45) Date of Patent: Apr. 24, 2007

(54) DEVICE FOR REDIRECTING OBJECTS HAVING DIFFERENT MASSES

(75) Inventors: Bernhard Heuft, Burgbrohl (DE); Gerd Kristandt, Worms (DE)

(73) Assignee: Heuft Systemtechnik GmbH, Burgbrohl (DE)

( * ) Notice: Subject to any disclaimer, the term of this patent is extended or adjusted under 35 U.S.C. 154(b) by 0 days.

(21) Appl. No.: 10/490,233

(22) PCT Filed: Sep. 6, 2002

(86) PCT No.: PCT/EP02/09982

§ 371 (c)(1),
(2), (4) Date: Aug. 31, 2004

(87) PCT Pub. No.: WO03/024848

PCT Pub. Date: Mar. 27, 2003

(65) Prior Publication Data

US 2005/0126884 A1     Jun. 16, 2005

(30) Foreign Application Priority Data

Sep. 19, 2001    (DE) .......................... 201 15 478 U

(51) Int. Cl.
*B07C 9/00* (2006.01)
(52) U.S. Cl. .................. 209/651; 209/652; 209/653; 198/370.02; 198/370.07; 198/367
(58) Field of Classification Search ................ 209/651, 209/652, 653
See application file for complete search history.

(56) References Cited

U.S. PATENT DOCUMENTS 4,321,994 A    3/1982  Heuft
5,092,451 A *  3/1992  Jones et al. ............... 198/460.1
5,979,635 A * 11/1999  Calhoun ...................... 198/456
6,189,702 B1 * 2/2001  Bonnet ........................ 209/651

FOREIGN PATENT DOCUMENTS

| DE | 36 33 327 C2 | 1/1988 |
| DE | 37 34 599 C1 | 3/1989 |
| DE | 299 08 036 U1 | 10/1999 |
| DE | 100 07 627 A1 | 9/2001 |
| EP | 00 89 847 A1 | 9/1983 |
| EP | 07 61 545 A2 | 3/1997 |
| EP | 0761545 A2 * | 12/1997 |
| FR | 27 24 916 A1 | 3/1996 |

OTHER PUBLICATIONS

German Search Report established for German Patent Application No. DE 201 15 478.1.
International Search Report established for International Patent Application No. PCT/EP02/09982.

* cited by examiner

*Primary Examiner*—Gene O. Crawford
*Assistant Examiner*—Terrell Matthews
(74) *Attorney, Agent, or Firm*—Drinker Biddle & Reath LLP

(57) ABSTRACT

An apparatus for selective diversion of objects such as containers, packing and packing units of different mass. The apparatus has a first transport device for the objects and a diversion device for diverting predetermined objects from the first transport device onto a second transport device. The intensity with which the objects are diverted from the first transport device onto the second transport device is controlled by means of a controlled device.

5 Claims, 2 Drawing Sheets

DEVICE FOR REDIRECTING OBJECTS HAVING DIFFERENT MASSES

CROSS-REFERENCE TO RELATED PATENT APPLICATIONS

This patent application is the National Stage of International Application No. PCT/EP02/09982 filed Sep. 6, 2002 which claims priority from German application DE 201 15 478.1 filed Sep. 19, 2001.

FIELD OF THE INVENTION

This invention pertains to product packaging machinery and, more particularly, to an apparatus and method for diverting defective product from a packaging line.

BACKGROUND OF THE INVENTION

Diversion apparatuses that are used to divert faulty objects, e.g., containers that are not completely full, from a flow of such objects are known in the art. From WO 00/68120 (DE-U-299 08 036) it is known to control the intensity with which objects are diverted in such a way that the objects receive a diversion impulse of differing strength transversely to their direction of transport and thus reach one of several second transport devices running parallel alongside each other. A similar apparatus is known from DE-A-100 07 627 in which upright bottles are diverted by means of a single impulse of a pusher, while horizontal bottles are diverted by means of an impulse sequence of the pusher.

An apparatus for sorting out faulty packaging units is known from DE-C2-36 23 327, which discloses a device where the angle at which the pusher pushes the packaging units from the conveyor belt being automatically controlled. The angle is set depending on the transport speed of the conveyor belt and the vector perpendicular to belt of the required pushing speed.

An apparatus for sorting out faulty packaging units, in particular bottles, is know from DE-C1-37 34 599, the pusher being driven by a cam and developed as a slide plate to which a brushing segment is attached. The shape and the speed of rotation of the cam determine the acceleration and the speed of the slide during the sorting-out process. It is to be thereby achieved that the path by which the packaging units to be sorted out or pushed is independent of the degree of filling of the packaging units.

Diversion devices have a diversion element, displaceable transversely to the direction of transport, which is driven pneumatically or by electric motor. The diversion element can also be in an air jet that pushes an object to be diverted transversely to the direction of transport. In the case of diversion apparatuses in which objects of different mass are to be diverted onto a second transport device, there is the difficulty that light objects are more markedly accelerated by the diversion device and thereby obtain a higher speed component transversely to the direction of transport than heavier objects.

The apparatus of the invention imparts a transverse impulse to the selected objects regardless of their mass. This leads to a roughly equally wide displacement of the objects transversely to the direction of transport. The basic idea of the invention is to detect the progress of the diversion of an object and to activate the diversion device more strongly or for longer depending on the established progress if the progress is less, or vice versa.

SUMMARY OF THE INVENTION

The invention relates to an apparatus for selective diversion of objects such as containers, packages and packing units of different mass. The apparatus has a first transport device for the objects and a diversion device for diverting predetermined objects from the first transport device onto a second transport device. The intensity with which the objects are diverted from the first transport device onto the second transport device is controlled by means of a controlled device.

Due to their greater mass heavy objects initially have a smaller speed component transversely to the direction of transport from the diversion element. The progress of the diversion is monitored by means of a sensor for example by measuring the period of time that the diversion element or the object to be diverted requires in order to reach a certain point of its diversion movement. When the sensor reports that this period of time is over a certain value the diversion device is activated more strongly for the remainder of the diversion movement, i.e., in the case of a pneumatic diversion device the diversion element is extended with a higher pressure or further and in the case of a diversion element driven by electric motor the voltage of the electromotor drive is increased or applied for a longer period. In the case of a diversion element in the form of an air jet, the nozzle pressure is increased or likewise applied for a longer period.

In an embodiment of the invention, the speed reached by the diversion element at a certain point in time after the start of the diversion process is measured through the use of, for example, an angle transmitter, a linear encoder, a speedometer or an acceleration indicator. The basic idea in each case is that the heavier object requires more time for the predetermined section or has reached a lesser speed than a lighter object, so that the diversion device has to be activated more strongly or for longer period of time, respectively.

In another embodiment, the diversion device can also be controlled by integrating in the diversion element a force sensor that measures the force with which the diversion element presses against the object. Because an object of greater mass will offer greater resistance to the diversion element, a higher force is measured. In the case of a diversion element driven by electric motor the power consumption can also be used as the measurement criteria.

Depending on the established progress, the diversion device is activated with greater force or for a longer period of time for lesser progress, and vice versa. Thus if a relatively low speed or a long extension time is ascertained at a predetermined point, the diversion device is activated more strongly or for a longer period of time. In the case of a pneumatic drive of the diversion device the pressure supplied to the cylinder is increased or the diversion element is further extended, i.e., the object is accelerated for a longer period of time by the diversion element transversely to the direction of transport. Correspondingly in the case of a drive by electric motor the supplied power is increased or the diversion process is prolonged.

The diversion apparatus according to the invention can also be used to divert objects of different mass from a first transport device onto one of a plurality of second transport devices. The further away from the first transport device the concerned second transport device is, the more strongly must the diversion device be activated, the activation additionally taking place according to the invention corresponding to the mass of the object.

The diversion apparatus according to the invention is suitable in particular for transport units in which the objects are transported past the diversion element at a very small distance of at most a few millimeters. The distance is to be particularly small compared to the length of the diversion movement of the diversion element. If the distance is greater e.g., 2 cm, the diversion apparatus according to the invention can also be used for stable objects, such as beer crates or mineral water crates if the distance is at least always the same.

DETAILED DESCRIPTION OF THE INVENTION

Figure 1:
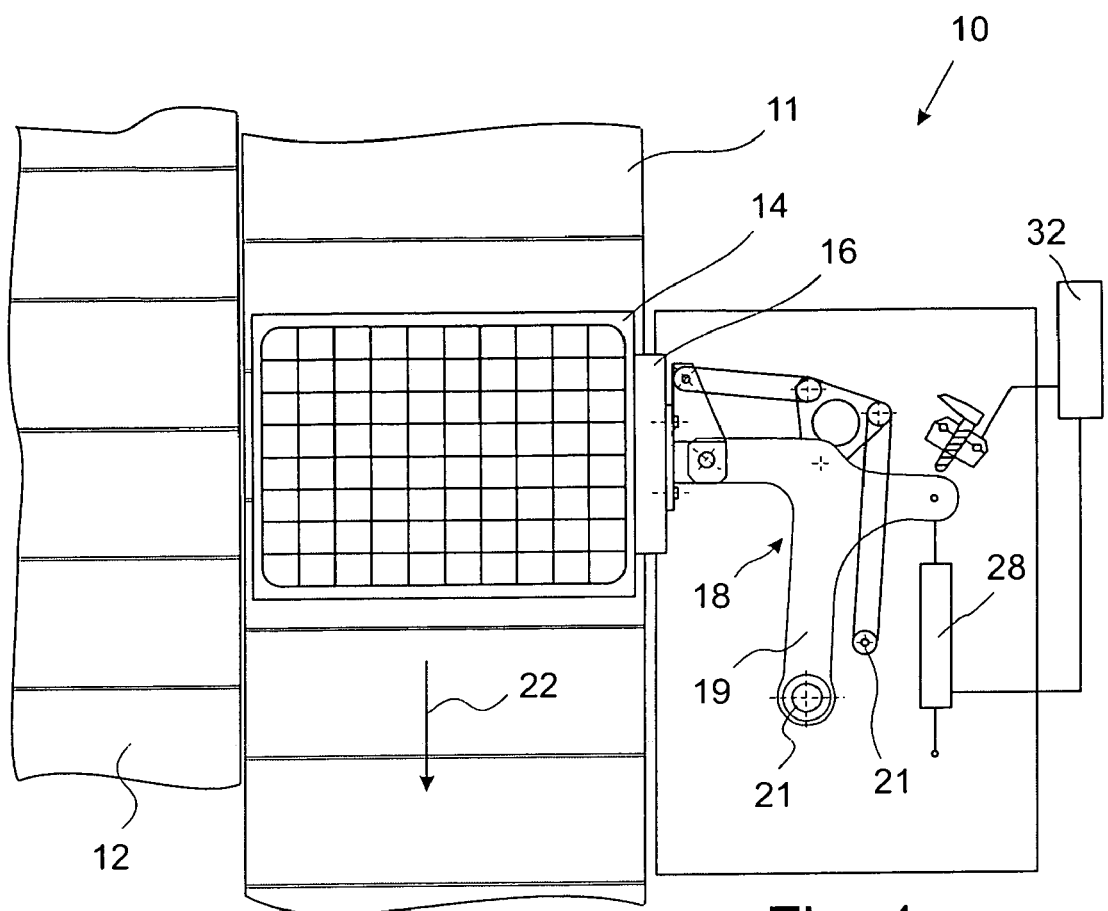
FIG. 1 is a top view the diversion device in the resting position.

A diversion device 10 is arranged next to a first conveyor 11, which is a link chain conveyor. The first conveyor 11 conveys an object 14, for example, a beer crate past the diversion device 10. The diversion device 10 serves to push certain objects 14, e.g., not completely filled beer crates, from the first conveyor 11 onto a second conveyor 12 running parallel alongside it, thereby excluding the defective object from the further production process.

The diversion device 10 contains a diversion element 16, which can be swiveled by means of a swivel arm 18. The diversion element 16 is a plate aligned in the direction of transport, and the swivel arm 18 is designed so that the alignment of the diversion element 16 is maintained upon swiveling out. To this end the swivel arm 18 consists of a main lever 19 and a parallel lever 20.

The pivot points 21 of the main lever 19 and of the parallel lever 20 are arranged vis-à-vis the diversion element 16 at a distance in the direction of transport indicated by the arrow 22, so that, upon swiveling out, the diversion element 16 moves at the same time roughly in the direction of transport. The object 14 is thus pushed essentially transversely, upon swiveling out of the diversion element 16, on the first conveyor 11, without a greater relative movement in the direction of transport taking place between the object 14 and the diversion element 16.

Figure 2:
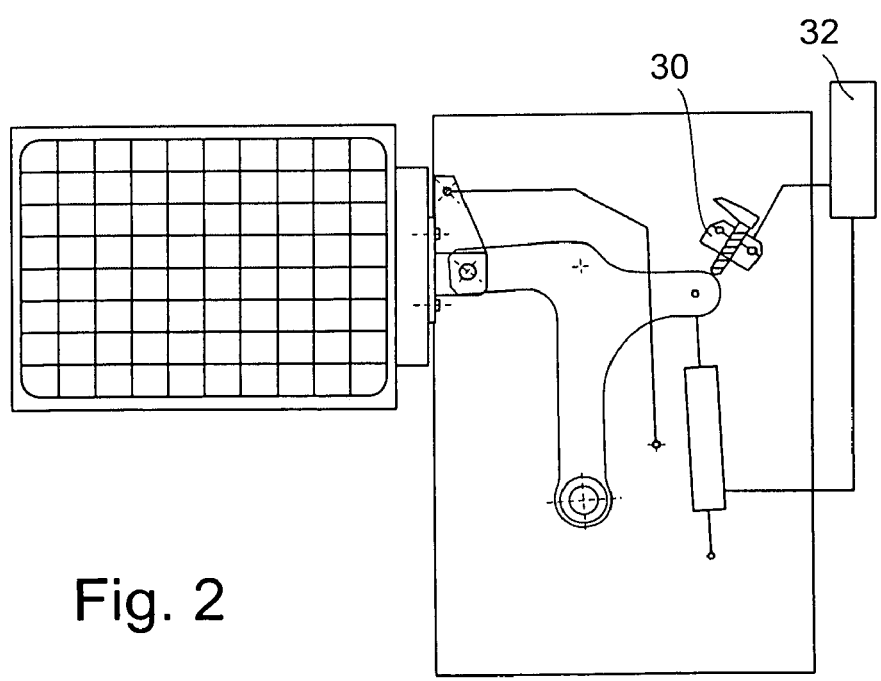
FIGS. 2 and 3 are top views of the diversion device at different times during a diversion process.
Figure 3:
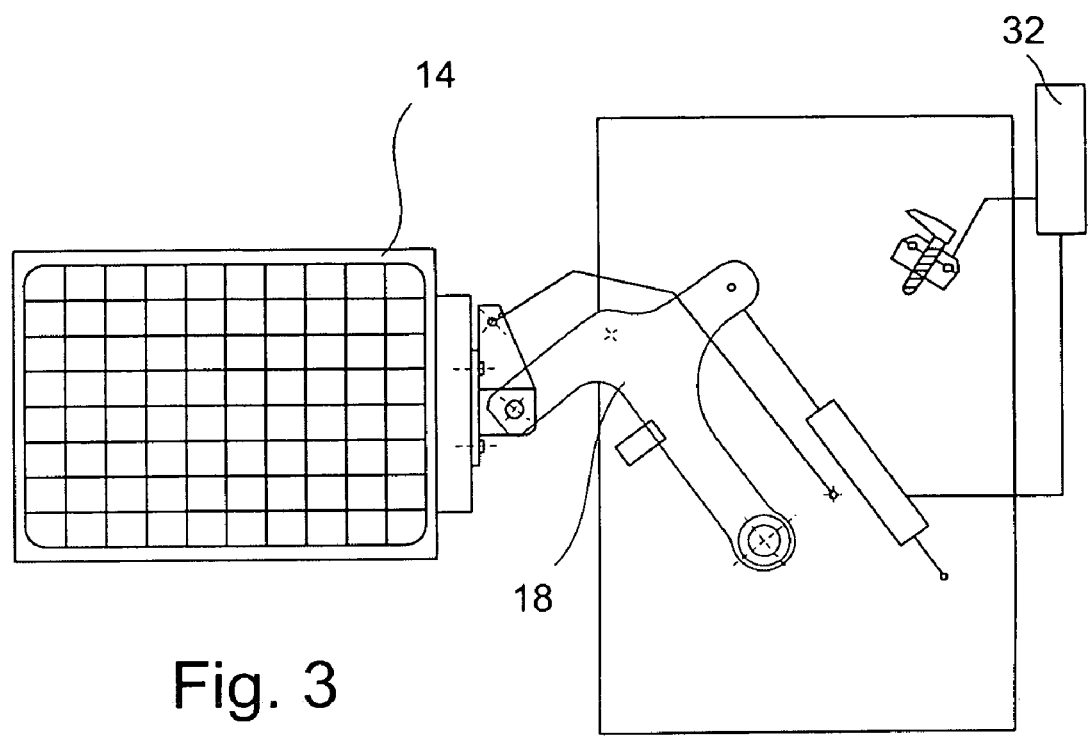

The main lever 19 is roughly T-shaped and is coupled at the bottom end of the vertical T-column in the pivot points 21. In the starting position shown in FIG. 1 the vertical T-column lies roughly counter parallel to the direction of transport 22. The diversion element 16 is coupled at the end of the horizontal T-bar pointing towards the first conveyor 11, while a swivel cylinder 28 engages at the end pointing away from the first conveyor 11. A sensor 30 is arranged at a small distance from this end of the horizontal T-bar. The sensor 30 produces a trigger signal when the end of the T-bar moves past it. This trigger signal is produced if the parallel lever 20 has swiveled by roughly 2° which corresponds to an extension section of the diversion element 16 of roughly 17 mm (FIG. 2).

The period of time "t" which passes between the triggering of the swivel cylinder 28 and the occurrence of the trigger signal serves as a measure of the mass of the object 14. The longer this period of time "t," the greater the mass of the object 14. The length of the trigger time T of the swivel cylinder 28 is controlled according to this period of time "t" by means of a control device 32. There are three gates lying one behind the other for the period of time "t."

Figure 4:
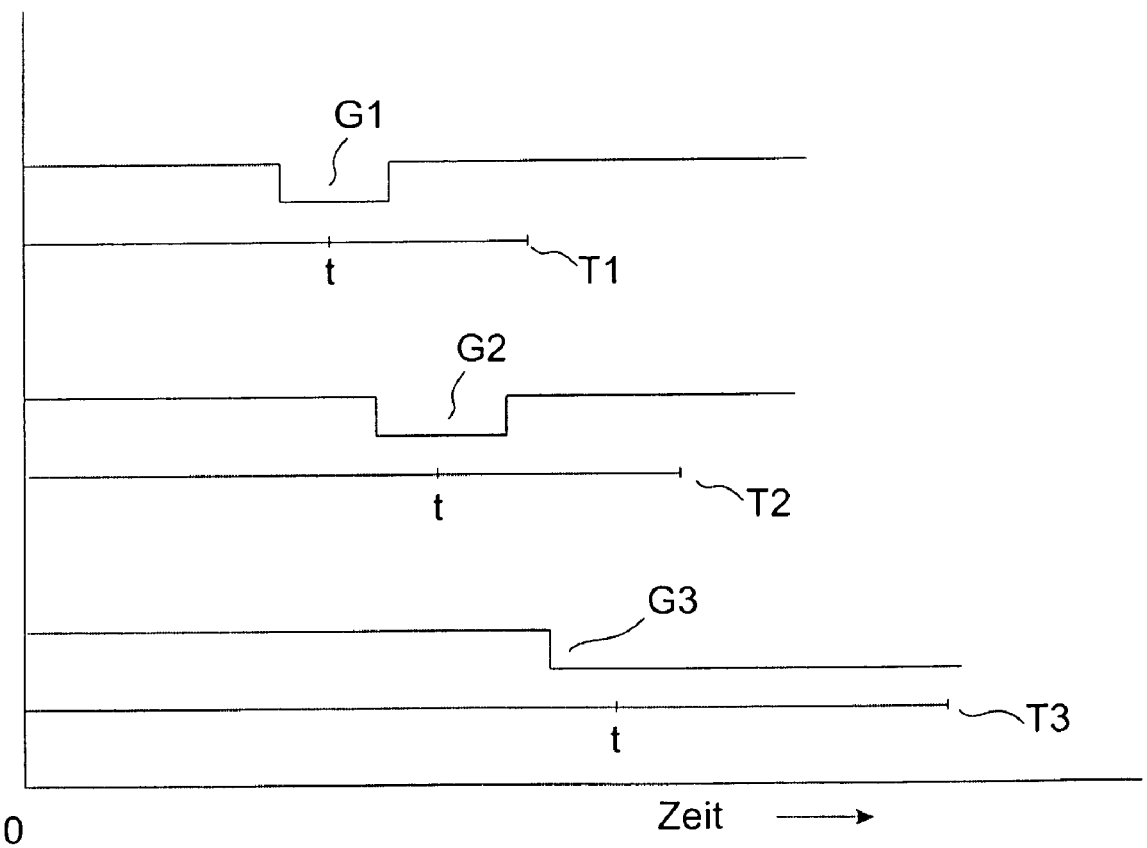
FIG. 4 the chronology of a diversion process.

If the period of time "t" falls within the range of the first gate G1, trigger time T1 is chosen. If the period of time "t" falls within the range of the second gate G2, trigger time T2, which is greater than T1, is used. If the period of time "t" falls within the third gate G3, then trigger time T3, which is greater than T2, is chosen (FIG. 4).

The trigger times T are established experimentally and taught to the control device 32. In the represented embodiment the trigger time T is controlled stepwise. However, it is preferably controlled continuously via a characteristic line. For this, several points of the characteristic line are established experimentally and the curve sections lying in between are interpolated.

When experimentally establishing the trigger times T or the characteristic line, the influence of the differing friction of heavier and lighter objects can be taken into account.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

The invention claimed is:

1. An apparatus for the selective sequential diversion of a plurality of objects of different mass, the apparatus comprising:

a first transport device;

a second transport device adjacent to the first;

a diversion element capable of applying a force to divert a selected object from said first transport device onto said second transport device;

a sensor for determining a period of time required for the diversion element to move from a first position on a first transport device to a second position intermediate of the second transport device; and a diversion element controller connected to the sensor that selects the force with which the diversion element diverts the selected object from the first transport device to the second transport device based on the mass of the selected object as determined by the dimension element controller based upon the period of time required for the diversion element to travel from the first position to the second position.

2. The apparatus of claim 1, wherein the force with which the diversion device diverts the selected object from the first transport device to the second transport device is a function of a period of time required for at least one of the diversion device and the selected object to cover a predetermined path.

3. The apparatus of claim 1, wherein the diversion device is pneumatically driven.

4. The apparatus of claim 1, wherein the selected object is transported on the second transport device for a small distance past the diversion device.

5. A method for selective diversion of objects of different mass from a first transport device onto a second transport device adjacent to the first transport device, the method comprised of the steps of:

conveying a plurality of objects of differing mass along the first transport device;

selecting an object from the plurality of objects of differing mass conveyed along the first transport device to be diverted onto the second transport device;

applying an initial force against the selected object;

determining the amount of time required to divert the selected object from the first transport device to a position intermediate of the second transport device;

comparing the determined amount of time to a standard amount of time required for diversion; and dynamically adjusting the amount of force with which the selected object is diverted from the intermediate position to the second transport device.

\* \* \* \* \*